United States Patent
Harris et al.

(10) Patent No.: US 11,879,072 B2
(45) Date of Patent: Jan. 23, 2024

(54) STYRENE BUTADIENE RUBBER LATEX COMPOSITIONS AND METHODS FOR MAKING AND USING SAME

(71) Applicant: LION COPOLYMER HOLDINGS, LLC, Geismar, LA (US)

(72) Inventors: Lawrence Douglas Harris, Geismar, LA (US); Willie C. Burton, Geismar, LA (US)

(73) Assignee: Lion Copolymers Holdings, LLC, Geismar, LA (US)

(*) Notice: Subject to any disclaimer, the term of this patent is extended or adjusted under 35 U.S.C. 154(b) by 0 days.

(21) Appl. No.: 18/141,537

(22) Filed: May 1, 2023

(65) Prior Publication Data

US 2023/0348762 A1    Nov. 2, 2023

Related U.S. Application Data

(63) Continuation of application No. 17/833,870, filed on Jun. 6, 2022, now Pat. No. 11,674,059.

(60) Provisional application No. 63/208,256, filed on Jun. 8, 2021.

(51) Int. Cl.
*C09J 109/08* (2006.01)
*C08F 236/10* (2006.01)

(52) U.S. Cl.
CPC ........... *C09J 109/08* (2013.01); *C08F 236/10* (2013.01)

(58) Field of Classification Search
CPC .............................. C09J 109/08; C08F 236/10
USPC .......................................................... 524/575
See application file for complete search history.

(56) References Cited

U.S. PATENT DOCUMENTS 4,515,914 A * 5/1985 Tsurumi ................ C08F 257/00
524/575

* cited by examiner

*Primary Examiner* — Kelechi C Egwim
(74) *Attorney, Agent, or Firm* — Kean Miller LLP; Robert Devin Ricci; Brian J. Servé

(57) ABSTRACT

Disclosed herein are styrene butadiene rubber latex compositions with high solids content and methods for making and using these compositions. The method for making the styrene butadiene rubber latex compositions can include mixing a seed, a styrene, an initiator, a base, a surfactant, and a solvent; adding a first portion of 1,3-butadiene to make a first reaction mixture; heating the first reaction mixture for a first reaction time to make a first styrene butadiene rubber latex; mixing the first styrene butadiene rubber latex, a styrene, a base, an initiator, a surfactant, and a solvent; adding a second portion of 1,3-butadiene to make a second reaction mixture; and heating the second reaction mixture for a second reaction time to make a second styrene butadiene rubber latex, where the second styrene butadiene rubber latex has a solids content higher than that of the first styrene butadiene rubber latex.

17 Claims, No Drawings ns. U.S. Pat. No.
STYRENE BUTADIENE RUBBER LATEX COMPOSITIONS AND METHODS FOR MAKING AND USING SAME

CROSS-REFERENCE TO RELATED APPLICATIONS

This application is a continuation of U.S. Nonprovisional application Ser. No. 17/833,870 entitled "STYRENE BUTADIENE RUBBER LATEX COMPOSITIONS AND METHODS FOR MAKING AND USING SAME" filed on Jun. 6, 2022, which claims benefit to provisional application titled "63/208,256, filed Jun. 8, 2021. The disclosures of both applications are incorporated in full by references as if copied herein.

BACKGROUND

Field

Disclosed herein are styrene butadiene rubber latex compositions and methods for making and using these compositions. More particularly, the methods can make styrene butadiene rubber latex compositions with high solids content, which can be used in adhesive compositions.

Description of the Related Art

Styrene butadiene rubber (SBR) is a synthetic rubber derived from styrene and butadiene. Styrene butadiene rubber is used in a wide variety of products, such as adhesives, coatings, paints, and tires. The preparation of styrene butadiene rubber by emulsion polymerization has long been known. Emulsion polymerization of styrene butadiene rubber is generally categorized into hot and cold, which refers the temperature at which the polymerization occurs. Hot emulsion polymerization generally occurs at a temperature around 50-60° C., while cold emulsion polymerization generally occurs at a temperature around 5° C. The performance characteristics of the resulting styrene butadiene rubbers is dependent upon the rubber composition, particle size, and rubber morphology.

Many techniques have been tried to control these parameters to provide a styrene butadiene rubber with the desired performance characteristics. For example, U.S. Pat. Nos. 5,189,107, 4,122,136 and 3,687,923, disclose latex polymers having uniform particle size can be obtained by using latex seeds in the polymerization reaction. U.S. Pat. No. 3,562,235 discloses modifying the polymeric morphology of latex polymers in a stepwise fashion by introducing different monomers at different stages of the polymerization reaction. A three-stage step wise addition process in combination with a polystyrene seed latex is disclosed by U.S. Pat. No. 4,742,108. This patent attempts to obtain a latex having high tensile strength without loss of elongation by employing a second stage monomer feed having a higher glass transition temperature than the first and third stage monomer feeds. U.S. Pat. No. 4,515,914 attempts to prepare highly coalescence-capable and deformable latexes using a two-stage polymerization process resulting in a copolymer core and a shell of linear styrene.

The method used for synthesizing the styrene butadiene rubber is chosen based upon the desired product. For example, the styrene butadiene rubber used in tires is not effective for coatings and adhesives. For adhesive and coating applications a high solids content of styrene butadiene rubber latex is needed. Currently, high solids content latexes are obtained by removing water from low solids emulsions obtained from conventional emulsion polymerization. However, this process is energy intensive and often results in coagulation of the styrene butadiene rubber latexes, which ruins their use in many products.

Consequently, there is a need for new methods of making high solids emulsion styrene butadiene rubber latexes that can be used in a variety of applications.

SUMMARY

Provided herein are high solids styrene butadiene rubber latexes and methods for making and using them. In a specific embodiment, the method includes: mixing a seed, a styrene, an initiator, a base, a surfactant, and a solvent to make a first mixture, where the first mixture has pH from about 4.0 to about 12.0; adding a first portion of 1,3-butadiene to the first mixture to make a first reaction mixture; heating the first reaction mixture to a temperature above 40° C. for a first reaction time from about 10 hours to about 24 hours to make a first styrene butadiene rubber latex, where the first styrene butadiene rubber latex has a solids content of greater than 30 wt %; mixing the first styrene butadiene rubber latex, a styrene, a base, an initiator, a surfactant, and a solvent to make a second mixture, where the second emulsion has a pH from about 4.0 to about 12.0; adding a second portion of 1,3-butadiene to the second mixture to make a second reaction mixture; and heating the second reaction mixture to a temperature above 40° C. for a second reaction time of from about 10 hours to about 24 hours to make a second styrene butadiene rubber latex, where solids concentration higher than that of the first solids concentration, where the second styrene butadiene rubber latex has a solids content of greater than 50 wt %.

In another specific embodiment, the method includes making the seed by mixing a monomer, an initiator, a base, a surfactant, and a solvent to make an initial reaction mixture, where the initial reaction mixture has pH from about 4.0 to about 12.0; heating the initial reaction mixture to a temperature above 40° C. for an initial reaction time from about 10 hours to about 24 hours to make the seeds, where the seed has a solids content of greater than 15 wt %.

In another specific embodiment, the styrene butadiene rubber latexes are made by mixing a seed, a styrene, an initiator, a base, a surfactant, and a solvent to make a first mixture, where the first mixture has pH from about 4.0 to about 12.0; adding a first portion of 1,3-butadiene to the first mixture to make a first reaction mixture; heating the first reaction mixture to a temperature above 40° C. for a first reaction time from about 10 hours to about 24 hours to make a first styrene butadiene rubber latex, where the first styrene butadiene rubber latex has a solids content of greater than 40 wt %; mixing the first styrene butadiene rubber latex, a styrene, a base, an initiator, a surfactant, and a solvent to make a second mixture, where the second emulsion has a pH from about 4.0 to about 12.0; adding a second portion of 1,3-butadiene to the second mixture to make a second reaction mixture; and heating the second reaction mixture to a temperature above 40° C. for a second reaction time of from about 10 hours to about 24 hours to make a second styrene butadiene rubber latex, yielding solids concentration higher than that of the first solids concentration, where the second styrene butadiene rubber latex has a solids content of greater than 50 wt %.

In another specific embodiment, an adhesive composition that includes a styrene butadiene rubber latex, where the styrene butadiene rubber latex has a solids content from about 50 wt % to about 60 wt %, where the styrene butadiene rubber has an average particle size from about 100 nm to about 250 nm; a tackifier agent; and water.

DETAILED DESCRIPTION

Disclosed herein are styrene butadiene rubber latexes with high solids content and methods for making them. The methods can include, but are not limited to: mixing one or more seeds, one or more styrenes, one or more initiators, one or more chain transfer agents, one or more bases, one or more acids, one or more salts, one or more surfactants, and one or more solvents to make a first mixture, adding a first portion of 1,3-butadiene to the first mixture to make a first reaction mixture; heating the first reaction mixture to a temperature for a first reaction time to make a first styrene butadiene rubber latex; mixing the first styrene butadiene rubber latex, one or more styrene, one or more base, one or more initiators, one or more surfactants, and one or more solvents to make a second mixture, adding a second portion of 1,3-butadiene to the second mixture to make a second reaction mixture; and heating the second reaction mixture to a temperature for a second reaction time to make a second styrene butadiene rubber latex, where the second styrene butadiene rubber latex has a solids which is higher than that of the first solids concentration. The method for making styrene butadiene rubber latexes can include a multi-step batch process. For example, the method for making styrene butadiene rubber latexes can include one, two, three, four, five, six, seven, eight, nine, ten, or more steps. The method for making styrene butadiene rubber latexes can include, but is not limited to, emulsion polymerization or solution polymerization. Also, the method for making styrene butadiene rubber latexes can include making the one or more seeds in an initial reaction mixture (discussed below).

The one or more seeds can include, but are not limited to: polystyrene, natural rubber, styrene-butadiene, styrene butadiene rubber, solution styrene butadiene, ethylene/alpha-olefin, nitrile rubber, polybutadiene, and mixtures thereof. The one or more seeds can be made in an initial reaction mixture before the first mixture of the method for making styrene butadiene rubber latexes or the one or more seed can be acquired commercially.

The one or more seeds can be included in the first mixture, first reaction mixture, second mixture, second reaction mixture, third mixture, third reaction mixture, and higher iterations of mixtures and reaction mixtures in a weight percent that varies widely. For example, the seeds can be included in the first mixture, first reaction mixture, second mixture, second reaction mixture, third mixture, third reaction mixture, and higher iterations of mixtures and reaction mixtures in a weight percent from a low of about 0.1 wt %, about 1 wt % or about 10 wt %, to a high of about 70 wt %, about 80 wt % or about 95 wt %. In another example, the seeds can be included in the first mixture, first reaction mixture, second mixture, second reaction mixture, third mixture, third reaction mixture, and higher iterations of mixtures and reaction mixtures in a weight percent from about 0.1 wt % to about 95 wt %, about 0.1 wt % to about 5 wt %, about 1 wt % to about 10 wt %, about 10 wt % to about 30 wt %, about 30 wt % to about 50 wt %. The one or more seeds can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based on the one or more styrenes, one or more seeds, one or more initiators, one or more chain transfer agents, one or more bases, one or more acids, one or more salts, one or more surfactants, and one or more solvents; or based on the one or more styrenes, 1,3-butadiene, one or more seeds, one or more initiators, one or more chain transfer agents, one or more bases, one or more acids, one or more salts, one or more surfactants, and one or more solvents.

The one or more seeds can have a particle size that varies widely. For example, the seeds can have an average particle size from a low of about 15 nm, about 25 nm, or about 40 nm, to a high of about 100 nm, 200 nm, or 500 nm. In another example, the seeds can have an average particle size from 15 nm to about 500 nm, about 20 nm to about 40 nm, about 30 nm to about 40 nm, about 20 nm to about 50 nm, about 25 nm to about 60 nm, about 30 nm to about 200 nm, about 70 nm to about 350 nm, about 100 nm to about 400 nm, or about 32 nm to about 85 nm.

The one or more seeds can be provided in an aqueous solution, latex, dispersion, or slurry. The initial reaction mixture can have a widely varying solids content. For example, the one or more seeds can have a solids content from a low of about 5 wt %, about 10 wt %, or about 30 wt %, to a high of about 70 wt %, about 80 wt %, or about 95 wt %. In another example, the one or more seeds in an aqueous slurry can have a solids content greater than about 50 wt %, about 65 wt %, or about 80 wt %. In another example, the one or more seeds can have a solids content from about 5 wt % to about 95 wt %, about 5 wt % to about 50 wt %, about 20 wt % to about 70 wt %, about 40 wt % to about 60 wt %, about 45 wt % to about 55 wt %, about 47 wt % to about 54 wt %, about 30 wt % to about 54 wt %, about 33 wt % to about 48 wt %, about 51 wt % to about 54 wt %, or about 50 wt % to about 80 wt %. The weight percent of the solids content of the one or more seeds can be based on the total weight of the composition or based on the total weight of the one or more seeds and water.

The one or more seeds can have a viscosity that can vary widely. For example, the one or more seeds can have a viscosity from a low of about 1 cP, about 100 cP, or about 100 cP, to a high of about 5,000 cP, to about 9,000 cP, or about 10,000 cP. In another example, the one or more seeds can have a viscosity from about 1 cP to about 10 cP, about 1 cP to about 500 cP, about 10 cP to about 50 cP, about 10 cP to about 100 cP, about 100 cP to about 500 cP, about 100 cP to about 7,500 cP, about 6,200 cP to about 8,500 cP, about 7,387 cP to about 7,500 cP, about 7,000 cP to about 8,000 cP, about 6,500 cP to about 8,550 cP, about 7,000 cP to about 8,000 cP, or about 5,000 cP to about 10,000 cP.

The 1,3-butadiene can be contacted with the one or more styrenes in the first reaction mixture, second reaction mixture, third reaction mixture, or higher iterations of reaction mixture in a weight percent that varies widely. For example, the 1,3-butadiene can be contacted with the styrene in the first reaction mixture, second reaction mixture, third reaction mixture, or higher iterations of reaction mixture in a weight percent from a low of about 5 wt %, about 10 wt % or about 20 wt %, to a high of about 70 wt %, about 80 wt % or about 95 wt %. In another example, the 1,3-butadiene can be contacted with the styrene in a weight percent from about 5 wt % to about 95 wt %, about 5 wt %, about 50 wt %, about 70 wt % to about 90 wt %, about 10 wt % to about 30 wt %, about 40 wt % to about 70 wt %. The 1,3-butadiene can be contacted with the styrene in a weight percent that can be based on the total weight to the first reaction mixture, second reaction mixture, third reaction mixture, or higher iterations of reaction mixture; based on the total weight of the 1,3-butadiene and the one or more styrenes; based on the one or more styrenes, 1,3-butadiene, one or more seeds, one or more initiators, one or more chain transfer agents, one or more bases, one or more acids, one or more salts, one or more surfactants, and one or more solvents.

The 1,3-butadiene can be contacted with the one or more styrenes in a single portion, multiple portions, or as a continuous flow. For example, the 1,3-butadiene can be contacted with the one or more styrenes in a single portion or multiple portions to make the first reaction mixture, second reaction mixture, third reaction mixture, and higher iterations of reaction mixtures. In another example, the 1,3-butadiene can be contacted with the one or more styrenes at a flow rate to make the first reaction mixture, second reaction mixture, third reaction mixture, and higher iterations of reaction mixtures. For example, the 1,3-butadiene can be contacted with the one or more styrenes at a flow rate of about rate of about 0.1 mL/min, about 1 mL/min, about 5 mL/min, about 10 mL/min, about 15 mL/min, or about 20 mL/min.

The 1,3-butadiene can be included in the first reaction mixture, second reaction mixture, third reaction mixture, and higher iterations of reaction mixtures in a weight percent that varies widely. For example, the 1,3-butadiene can be included in the first reaction mixture, second reaction mixture, third reaction mixture, and higher iterations in a weight percent from a low of about 5 wt %, about 10 wt % or about 20 wt %, to a high of about 70 wt %, about 80 wt % or about 95 wt %. In another example, the 1,3-butadiene can be included in the first reaction mixture, second reaction mixture, third reaction mixture, and higher iterations of reaction mixtures in a weight percent from about 5 wt % to about 95 wt %, about 5 wt % to about 80 wt %, about 70 wt % to about 90 wt %, about 10 wt % to about 30 wt %, about 40 wt % to about 70 wt %. The 1,3-butadiene can be included in the first reaction mixture, second reaction mixture, third reaction mixture, and higher iterations of reaction mixtures in a weight percent that can be based on the total weight to the first reaction mixture, second reaction mixture, third reaction mixture, or higher iterations of reaction mixture; or based the one or more styrenes, 1,3-butadiene, one or more seeds, one or more initiators, one or more chain transfer agents, one or more bases, one or more acids, one or more salts, one or more surfactants, and one or more solvents.

The one or more initiators can include, but are not limited to: potassium persulfate, cumene hydroperoxide, 2,2'-azobis[2-(2-imidazolin-2-yl)propane] dihydrochloride, tert-butyl hydroperoxide, di-tert-butyl peroxide, dicumyl peroxide, benzoyl peroxide, ammonium peroxodisulfate, dicyandiamide, cyclohexyl p-toluenesulfonate, (4-hydroxyphenyl) dimethylsulfonium hexafluorophosphate, diphenyl(methyl)sulfonium tetrafluoroborate, benzyl(4-hydroxyphenyl)methyl sulfonium hexafluoroantimonate, (4-hydroxyphenyl) methyl(2-methylbenzyl)sulfonium hexafluoroantimonate, triphenylsulfonium nonafluoro-1-butanesulfonate, and mixtures thereof.

The one or more initiators can be included in the first mixture, first reaction mixture, second mixture, second reaction mixture, third mixture, third reaction mixture, and higher iterations of mixtures and reaction mixtures in a weight percent that varies widely. For example, the initiators can be included to the first mixture, first reaction mixture, second mixture, second reaction mixture, third mixture, third reaction mixture, and higher iterations of mixtures and reaction mixtures in a weight percent from a low of about 0.01 wt %, about 0.1 wt % or about 1 wt %, to a high of about 5 wt %, about 10 wt % or about 15 wt %. In another example, the initiators can be included in the first mixture, first reaction mixture, second mixture, second reaction mixture, third mixture, third reaction mixture, and higher iterations of mixtures and reaction mixtures in a weight percent from about 0.01 wt % to about 0.1 wt %, about 0.01 wt % to about 5 wt %, about 0.02 wt % to about 1.0 wt %, or about 0.3 wt % to about 10 wt %. The initiators can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based the one or more styrenes, one or more seeds, one or more initiators, one or more chain transfer agents, one or more bases, one or more acids, one or more salts, one or more surfactants, and one or more solvents; or based the one or more styrenes, 1,3-butadiene, one or more seeds, one or more initiators, one or more chain transfer agents, one or more bases, one or more acids, one or more salts, one or more surfactants, and one or more solvents.

The one or more chain transfer agents can include, but are not limited to: alkyl mercaptan, tert-dodecyl mercaptan, carbon tetrachloride, carbon tetrabromide, bromotrichloromethane, 4-methylbenzenethiol, isooctyl 3-mercaptopropionate, pentaphenylethane, tert-nonyl mercaptan, 4,4'-thiobisbenzenethiol. The one or more chain transfer agents can include commercially available chain transfer agents, such as sulfole-120.

The one or more chain transfer agents can be included in the first mixture, first reaction mixture, second mixture, second reaction mixture, third mixture, third reaction mixture, and higher iterations of mixtures and reaction mixtures in a weight percent that varies widely. For example, the chain transfer agents can be included in the first mixture, first reaction mixture, second mixture, second reaction mixture, third mixture, third reaction mixture, and higher iterations of mixtures and reaction mixtures in a weight percent from a low of about 0.00075 wt %, about 0.001 wt % or about 0.005 wt %, to a high of about 1.0 wt %, about 5 wt % or about 10 wt %. In another example, the chain transfer agents can be included in the first mixture, first reaction mixture, second mixture, second reaction mixture, third mixture, third reaction mixture, and higher iterations of mixtures and reaction mixtures in a weight percent from about 0.00075 wt % to about 0.001 wt %, about 0.00090 wt % to about 1 wt %, about 0.001 wt % to about 0.01 wt %, about 0.00080 wt % to about 2 wt %, about 0.01 wt % to about 2 wt %, about 1 wt % to about 2 wt %, or about 0.00075 wt % to about 5 wt %. The chain transfer agents can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based the one or more styrenes, one or more seeds, one or more initiators, one or more chain transfer agents, one or more bases, one or more acids, one or more salts, one or more surfactants, and one or more solvents; or based the one or more styrenes, 1,3-butadiene, one or more seeds, one or more initiators, one or more chain transfer agents, one or more bases, one or more acids, one or more salts, one or more surfactants, and one or more solvents.

The one or more acids can include, but are not limited to, citric acid, nitric acid, hydrochloric acid, acetic acid, phosphoric acid, sodium bisulfate, monosodium dihydrogen orthophosphate, disodium hydrogen phosphate, potassium bisulfite, ammonium chloride, ammonium sulfate, and combinations thereof.

The one or more acids can be included in the first mixture, first reaction mixture, second mixture, second reaction mixture, third mixture, third reaction mixture, and higher iterations of mixtures and reaction mixtures in a weight percent that varies widely. For example, the acids can be included in the first mixture, first reaction mixture, second mixture, second reaction mixture, third mixture, third reaction mixture, and higher iterations of mixtures and reaction mixtures in a weight percent from a low of about 0.1 wt %, about 1 wt % or about 10 wt %, to a high of about 30 wt %, about 40 wt % or about 50 wt %. In another example, the acids can be included in the first mixture, first reaction mixture, second mixture, second reaction mixture, third mixture, third reaction mixture, and higher iterations of mixtures and reaction mixtures in a weight percent from about 0.1 wt % to about 60 wt %, about 0.1 wt % to about 5 wt %, about 1 wt % to about 2 wt %, about 1 wt % to about 5 wt %, about 10 wt % to about 30 wt %. The acids can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based the one or more styrenes, one or more seeds, one or more initiators, one or more chain transfer agents, one or more bases, one or more acids, one or more salts, one or more surfactants, and one or more solvents; or based the one or more styrenes, 1,3-butadiene, one or more seeds, one or more initiators, one or more chain transfer agents, one or more bases, one or more acids, one or more salts, one or more surfactants, and one or more solvents.

The one or more bases can include, but are not limited to, sodium hydroxide, potassium hydroxide, monopotassium phosphate, monosodium phosphate, disodium phosphate, dipotassium phosphate, trisodium phosphate, tripotassium phosphate, sodium bicarbonate, potassium carbonate, sodium tripolyphosphate, zinc chloride sodium carbonate, hydroxide, potassium cyanide, magnesium oxychloride, sodium acetate, bismuth oxychloride sodium, potassium sulfate, and combinations thereof.

The one or more bases can be included in the first mixture, first reaction mixture, second mixture, second reaction mixture, third mixture, third reaction mixture, and higher iterations of mixtures and reaction mixtures in a weight percent that varies widely. For example, the bases can be included in the first mixture, first reaction mixture, second mixture, second reaction mixture, third mixture, third reaction mixture, and higher iterations of mixtures and reaction mixtures in a weight percent from a low of about 0.005 wt %, about 0.01 wt % or about 1 wt %, to a high of about 2 wt %, about 5 wt % or about 30 wt %. In another example, the bases can be included in the first mixture, first reaction mixture, second mixture, second reaction mixture, third mixture, third reaction mixture, and higher iterations of mixtures and reaction mixtures in a weight percent from about 0.005 wt % to about 0.01 wt %, about 0.005 wt % to about 0.1 wt %, about 0.01 wt % to about 1 wt %, about 1 wt % to about 5 wt %, about 10 wt % to about 30 wt %. The bases can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based the one or more styrenes, one or more seeds, one or more initiators, one or more chain transfer agents, one or more bases, one or more acids, one or more salts, one or more surfactants, and one or more solvents; or based the one or more styrenes, 1,3-butadiene, one or more seeds, one or more initiators, one or more chain transfer agents, one or more bases, one or more acids, one or more salts, one or more surfactants, and one or more solvents.

The one or more salts can include, but are not limited to, calcium chloride, sodium bisulfate, sodium carbonate, sodium hydrogen sulfate, sodium chloride, potassium chloride, potassium chlorate, calcium phosphate, potassium perchlorate, and combinations thereof.

The one or more salts can be included in the first mixture, first reaction mixture, second mixture, second reaction mixture, third mixture, third reaction mixture, and higher iterations of mixtures and reaction mixtures in a weight percent that varies widely. For example, the salts can be included in the first mixture, first reaction mixture, second mixture, second reaction mixture, third mixture, third reaction mixture, and higher iterations of mixtures and reaction mixtures in a weight percent from a low of about 0.1 wt %, about 0.5 wt % or about 1 wt %, to a high of about 3 wt %, 5 wt %. or about 20 wt %. In another example, the salts can be included in the first mixture, first reaction mixture, second mixture, second reaction mixture, third mixture, third reaction mixture, and higher iterations of mixtures and reaction mixtures in a weight percent from about 0.2 wt % to about 0.5 wt %, about 0.1 wt % to about 3 wt %, about 0.1 wt % to about 2 wt %, about 1 wt % to about 5 wt %, about 10 wt % to about 30 wt %. The salts can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based on the one or more styrenes, one or more seeds, one or more initiators, one or more chain transfer agents, one or more bases, one or more acids, one or more salts, one or more surfactants, and one or more solvents; or based on the one or more styrenes, 1,3-butadiene, one or more seeds, one or more initiators, one or more chain transfer agents, one or more bases, one or more acids, one or more salts, one or more surfactants, and one or more solvents.

The one or more surfactants can include, but are not limited to: alkyldiphenyloxide disulfonate; benzene, 1,1'-oxybis-, tetrapropylene sulfonate; sodium 4-(4-dodecoxysulfonylphenoxy)benzenesulfonate; alkyl mercaptan; ethoxylated amines; ethoxylated long-chain alcohols; polyglucosides; alkyl ammonium bromides; alkyl sulfonates; alkoxylated sulfates; alkyl ether sulfates; alkyl ester sulfonates; alpha olefin sulfonates; linear alkyl benzene sulfonates; branched alkyl benzene sulfonates; linear dodecylbenzene sulfonates; branched dodecylbenzene sulfonates; alkyl benzene sulfonic acids; dodecylbenzene sulfonic acid; sulfosuccinates; ethoxylated sulfated alcohols; alcohol sulfonates; ethoxylated alcohol sulfonates; propoxylated alcohol sulfonates; alcohol ether sulfates; ethoxylated alcohol ether sulfates; propoxylated alcohol sulfonates; sodium xylene sulfonate; sodium dodecyl diphenyl ether disulfonate; sulfated nonyl phenols; ethoxylated sulfated nonyl phenols; propoxylated sulfated nonyl phenols; sulfated octyl phenols; ethoxylated sulfated octyl phenols; propoxylated sulfated octyl phenols; sulfated dodecyl phenols; ethoxylated sulfated dodecyl phenols hydroxysultaines; propoxylated sulfated dodecyl phenols hydroxysultaines; ethoxylated dodecanol; alkyl ammonium bromides; cetyl trimethyl ammonium bromide; methyl sulfonate; heptyl sulfonate; decylbenzene sulfonate; dodecylbenzene sulfonate; cocoamidopropyl hydroxysultaine; lauramidopropyl hydroxysultaine; lauryl hydroxysultaine; and combinations thereof. The one or more surfactants can be anionic, cationic, zwitterionic, amphoteric, or non-ionic.

The one or more surfactants can be included in the first mixture, first reaction mixture, second mixture, second reaction mixture, third mixture, third reaction mixture, and higher iterations of mixtures and reaction mixtures in a weight percent that varies widely. For example, the surfactants can be included in the first mixture, first reaction mixture, second mixture, second reaction mixture, third mixture, third reaction mixture, and higher iterations of mixtures and reaction mixtures in a weight percent from a low of about 0.004 wt %, about 0.01 wt % or about 1 wt %, to a high of about 0.05 wt %, about 1 wt % or about 30 wt %. In another example, the surfactants can be included in the first mixture, first reaction mixture, second mixture, second reaction mixture, third mixture, third reaction mixture, and higher iterations of mixtures and reaction mixtures in a weight percent from about 0.004 wt % to about 0.03 wt %, about 0.004 wt % to about 0.01 wt %, about 0.005 wt % to about 1 wt %, about 0.1 wt % to about 2 wt %, about 0.1 wt % to about 30 wt %. The surfactants can be included in the first mixture, first reaction mixture, second mixture, second reaction mixture, third mixture, third reaction mixture, and higher iterations of mixtures and reaction mixtures in a weight percent that can be based on the total weight to the first reaction mixture, second reaction mixture, third reaction mixture, or higher iterations of reaction mixture; based on the one or more styrenes, one or more seeds, one or more initiators, one or more chain transfer agents, one or more bases, one or more acids, one or more salts, one or more surfactants, and one or more solvents; or based on the one or more styrenes, 1,3-butadiene, one or more seeds, one or more initiators, one or more chain transfer agents, one or more bases, one or more acids, one or more salts, one or more surfactants, and one or more solvents.

The one or more solvents for the first mixture, first reaction mixture, second mixture, second reaction mixture, third mixture, third reaction mixture, and higher iterations of mixtures and reaction mixtures can include, but are not limited to, water, deionized water, methanol, ethanol, propanol, isopropanol, acetone, benzene, acetonitrile, chloroform, diethyl ether, methylene chloride, dimethyl formamide, ethylene glycol, propylene glycol, triethylamine, tetrahydrofuran, and combinations thereof.

The one or more solvents can be included in the first mixture, first reaction mixture, second mixture, second reaction mixture, third mixture, third reaction mixture, and higher iterations of mixtures and reaction mixtures in a weight percent that varies widely. For example, the solvents can be included in the first mixture, first reaction mixture, second mixture, second reaction mixture, third mixture, third reaction mixture, and higher iterations of mixtures and reaction mixtures in a weight percent from a low of about 5 wt %, about 10 wt % or about 20 wt %, to a high of about 70 wt %, about 80 wt % or about 95 wt %. In another example, the solvents can be included in the first mixture, first reaction mixture, second mixture, second reaction mixture, third mixture, third reaction mixture, and higher iterations of mixtures and reaction mixtures in a weight percent from about 6 wt % to about 12 wt %, about 5 wt % to about 95 wt %, about 5 wt % to about 15 wt %, about 7 wt % to about 30 wt %, about 8 wt % to about 70 wt %. The solvents can be included in the first mixture, first reaction mixture, second mixture, second reaction mixture, third mixture, third reaction mixture, and higher iterations of mixtures and reaction mixtures in a weight percent that can be based on the total weight of the first reaction mixture, second reaction mixture, third reaction mixture, or higher iterations of reaction mixture; based on the one or more styrenes, one or more seeds, one or more initiators, one or more chain transfer agents, one or more bases, one or more acids, one or more salts, one or more surfactants, and one or more solvents; or based on the one or more styrenes, 1,3-butadiene, one or more seeds, one or more initiators, one or more chain transfer agents, one or more bases, one or more acids, one or more salts, one or more surfactants, and one or more solvents.

The first mixture, first reaction mixture, second mixture, second reaction mixture, third mixture, third reaction mixture, and higher iterations of mixtures and reaction mixtures can be reacted and/or stirred in an open container or a closed container. The first mixture, first reaction mixture, second mixture, second reaction mixture, third mixture, third reaction mixture, and higher iterations of mixtures and reaction mixtures can be reacted and/or stirred under a vacuum. The first mixture, first reaction mixture, second mixture, second reaction mixture, third mixture, third reaction mixture, and higher iterations of mixtures and reaction mixtures can be reacted and/or stirred under an inert atmosphere, such as He, Ne, Ar, $N_2$, and Ar.

In an embodiment, the reaction occurs in a pressure reactor. The first mixture, first reaction mixture, second mixture, second reaction mixture, third mixture, third reaction mixture, and higher iterations of mixtures and reaction mixtures can be reacted and/or stirred under a widely varying gauge pressure. For example, first mixture, first reaction mixture, second mixture, second reaction mixture, third mixture, third reaction mixture, and higher iterations of mixtures and reaction mixtures can be reacted and/or stirred under a gauge pressure from a low of about 0.1 psig, about 1 psig, or about 5 psig, to a high of about 50 psig, about 90 psig, or about 150 psig. In another example, first mixture, first reaction mixture, second mixture, second reaction mixture, third mixture, third reaction mixture, and higher iterations of mixtures and reaction mixtures can be reacted and/or stirred under a gauge pressure from about 30 psig to about 85 psig, about 0.1 psig to about 90 psig, about 0.1 psig to about 1 psig, about 1 psig to about 85 psig, about 20 psig to about 90 psig, about 5 psig to about 20 psig, about 25 psig to about 75 psig, or about 0.1 psig to about 150 psig.

The first mixture, first reaction mixture, second mixture, second reaction mixture, third mixture, third reaction mixture, and higher iterations of mixtures and reaction mixtures can be agitated and/or stirred. For example, the mixtures and reaction mixtures can be stirred from about 50 revolution per minute (rpm) to about 1,500 rpm, about 50 rpm to about 500 rpm or about 60 rpm to about 1,000 rpm.

The first mixture, first reaction mixture, second mixture, second reaction mixture, third mixture, third reaction mixture, and higher iterations of mixtures and reaction mixtures can have a viscosity that can vary widely. For example, the first, second, third, and higher iterations of styrene butadiene rubber latexes can have a viscosity from a low of about 1 cP, about 100 cP, or about 100 cP, to a high of about 5,000 cP, to about 9,000 cP, or about 10,000 cP. In another example, the first, second, third, and higher iterations of styrene butadiene rubber latexes can have a viscosity from about 1 cP to about 10 cP, about 1 cP to about 500 cP, about 10 cP to about 50 cP, about 10 cP to about 100 cP, about 100 cP to about 500 cP, about 6,200 cP to about 8,500 cP, about 7,387 cP to about 7,500 cP, about 7,000 cP to about 8,000 cP, about 6,500 cP to about 8,550 cP, about 7,000 cP to about 8,000 cP, or about 5,000 cP to about 10,000 cP.

The pH of the first mixture, first reaction mixture, second mixture, second reaction mixture, third mixture, third reaction mixture, and higher iterations of mixtures and reaction mixtures can vary widely. For example, the first mixture, first reaction mixture, second mixture, second reaction mixture, third mixture, third reaction mixture, and higher iterations of mixtures and reaction mixtures can have a pH from about 4.0 to about 12.0, about 5.0 to about 10.0, about 7.5 to about 11.0, about 7.0 to about 10.0, about 8.0 to about 9.0, about 9.0 to about 10.0, about 8.0 to about 10.0, about 9.0 to about 11.0, or about 6.0 to about 9.0.

The first mixture, first reaction mixture, second mixture, second reaction mixture, third mixture, third reaction mixture, and higher iterations of mixtures and reaction mixtures can be heated to a temperature from a low of about 0° C., about 15° C., and about 25° C., to a high of about 35° C., about 65° C., and about 200° C. For example, the first mixture, first reaction mixture, second mixture, second reaction mixture, third mixture, third reaction mixture, and higher iterations of mixtures and reaction mixtures can be heated to a temperature from about 25° C. to about 28° C., about 25° C. to about 35° C., about 25° C. to about 90° C., about 30° C. to about 45° C., about 40° C. to about 90° C., about 43° C. to about 78° C., about 40° C. to about 90° C., about 100° C. to about 200° C. In another example, the first mixture, first reaction mixture, second mixture, second reaction mixture, third mixture, third reaction mixture, and higher iterations of mixtures and reaction mixtures can be at room temperature. In another example, the reaction occurs at a temperature of greater than about 40° C. or greater than about 50° C. The first reaction mixture, second reaction mixture, third reaction mixture, and higher iterations and reaction mixtures can be performed at different temperatures. The method for making styrene butadiene rubber latexes can occur at different temperatures than the method of making the one or more seeds.

The first mixture, first reaction mixture, second mixture, second reaction mixture, third mixture, third reaction mixture, and higher iterations of mixtures and reaction mixtures can be reacted and/or stirred for a first reaction time, second reaction time, third reaction time, and higher iterations of reaction times from a short of about 15 s, about 120 s, or about 300 s, to a long of about 1 h, about 24 h, or about 72 h. For example, the first mixture, first reaction mixture, second mixture, second reaction mixture, third mixture, third reaction mixture, and higher iterations of mixtures and reaction mixtures can be reacted and/or stirred for a first reaction time, second reaction time, third reaction time, and higher iterations of reaction times can be from about 1 min to about 15 min, about 5 min to about 45 min, about to about, about 1 h to about 12 h, about 5 h to about 15 h, about 10 hours to about 24 hours, about 12 h to about 17 h, about 12 h to about 24 h, about 22 h to about 50 h, or about 24 h to about 72 h.

The first, second, third, and higher iterations of styrene butadiene rubber latexes can have a styrene butadiene rubber with a weight-average molecular weight ($M_w$) that varies widely. For example, the first, second, third, and higher iterations of styrene butadiene rubber latexes can have a styrene butadiene rubber with a weight-average molecular weight from a low of about 50,000 g/mol, about 60,000 g/mol, or about 70,000 g/mol, to a high of about 700,000 g/mol, about 800,000 g/mol, or about 900,000 g/mol. In another example, the first, second, third, and higher iterations of styrene butadiene rubber latexes can have a styrene butadiene rubber with a weight-average molecular weight from about 50,000 g/mol to about 900,000 g/mol, about 50,000 g/mol to about 700,000 g/mol, about 55,000 g/mol to about 850,000 g/mol, about 60,000 g/mol to about 800,000 g/mol, about 100,000 g/mol to about 700,000 g/mol, about 170,000 g/mol to about 535,000 g/mol, about 76,941 g/mol to about 803,904 g/mol, about 250,000 g/mol to about 535,000 g/mol, or about 70,000 g/mol to about 660,000 g/mol.

The first, second, third, and higher iterations of styrene butadiene rubber latexes can have a styrene butadiene rubber with a number-average molecular weight ($M_n$) that varies widely. For example, the first, second, third, and higher iterations of styrene butadiene rubber latexes can have a styrene butadiene rubber a number-average molecular weight from a low of about 16,000 g/mol, about 20,000 g/mol, or about 23,000 g/mol, to a high of about 150,000 g/mol, about 170,000 g/mol, or about 200,000 g/mol. In another example, the first, second, third, and higher iterations of styrene butadiene rubber latexes can have a styrene butadiene rubber with a number-average molecular weight from about 19,000 g/mol to about 190,000 g/mol, about 20,000 g/mol to about 150,000 g/mol, about 23,000 g/mol to about 40,000 g/mol, about 24,000 g/mol to about 100,000 g/mol, about 70,000 g/mol to about 135,000 g/mol, about 16,000 g/mol to about 109,000 g/mol, about 26,747 g/mol to about 147,862 g/mol, about 30,000 g/mol to about 85,000 g/mol, or about 60,000 g/mol to about 160,000 g/mol.

The first, second, third, and higher iterations of styrene butadiene rubber latexes can have a styrene butadiene rubber with a higher-average molecular weight ($M_z$) that varies widely. For example, the first, second, third, and higher iterations of styrene butadiene rubber latexes can have a styrene butadiene rubber with a higher-average molecular weight from a low of about 150,000 g/mol, about 260,000 g/mol, or about 300,000 g/mol, to a high of about 900,000 g/mol, about 1,000,000 g/mol, or about 1,600,000 g/mol. In another example, the first, second, third, and higher iterations of styrene butadiene rubber latexes can have a styrene butadiene rubber with a higher-average molecular weight from about 150,000 g/mol to about 900,000 g/mol, about 160,000 g/mol to about 1,500,000 g/mol, about 260,000 g/mol to about 900,000 g/mol, about 500,000 g/mol to about 1,107,000 g/mol, about 220,000 g/mol to about 1,260,000 about 100,000 g/mol to about 1,000,000 g/mol, about 170,000 g/mol to about 535,000 g/mol, or about 216,246 g/mol to about 1,438,250 g/mol.

The first, second, third, and higher iterations of styrene butadiene rubber latexes can have a styrene butadiene rubber with a molecular weight distribution (Mw/Mn) from a low of about 2.3, about 4.0, or about 5.0, to a high of about 6.0, about 7.0, or about 10. For example, the first, second, third, and higher iterations of styrene butadiene rubber latexes can have a styrene butadiene rubber with a molecular weight distribution from about 2.3 to about 8.6, about 3.0 to about 9.0, about 2.9 to about 7.8, about 5.0 to about 6.0, about 5.9 to about 6.2, or about 4.0 to about 7.0. about 2.3 to about 8.6.

The first, second, third, and higher iterations of styrene butadiene rubber latexes can have a styrene butadiene rubber with a molecular weight of the highest peak ($M_p$) that varies widely. For example, the first, second, third, and higher iterations of styrene butadiene rubber latexes can have a styrene butadiene rubber with a molecular weight of the highest peak from a low of about 35,000 g/mol, about 40,000 g/mol, or about 45,000 g/mol, to a high of about 900,000 g/mol, about 1,000,000 g/mol, or about 1,600,000 g/mol. In another example, the first, second, third, and higher iterations of styrene butadiene rubber latexes can have a styrene butadiene rubber with a molecular weight of the highest peak from about 35,000 g/mol to about 900,000 g/mol, about 36,000 g/mol to about 150,000 g/mol, about 35,000 g/mol to about 270,000 g/mol, about 57,000 g/mol to about 260,000 g/mol, about 40,000 g/mol to about 1,000,000 g/mol, about 100,000 g/mol to about 1,000,000 g/mol, about 170,000 g/mol to about 535,000 g/mol, or about 43,953 g/mol to about 1,047,055 g/mol.

The first, second, third, and higher iterations of styrene butadiene rubber latexes can have a styrene butadiene rubber with an average particle size that varies widely. For example, the first, second, third, and higher iterations of styrene butadiene rubber latexes can have a styrene butadiene rubber with an average particle size from a low of about 15 nanometers (nm), about 25 nm, or about 40 nm, to a high of about 100 nm, about 200 nm, or about 500 nm. In another example, the first, second, third, and higher iterations of styrene butadiene rubber latexes can have a styrene butadiene rubber can have an average particle size from 15 nm to about 500 nm, about 25 nm to about 500 nm, about 20 nm to about 50 nm, about 25 nm to about 60 nm, about 30 nm to about 200 nm, about 40 nm to about 250 nm, about 70 nm to about 350 nm, about 100 nm to about 400 nm, about 100 nm to about 250 nm, or about 132 nm to about 500 nm.

The first, second, third, and higher iterations of styrene butadiene rubber latexes can be provided in an aqueous solution, latex, dispersion, or slurry. The first, second, third, and higher iterations of styrene butadiene rubber latexes can have a widely varying solids content. For example, the first, second, third, and higher iterations of styrene butadiene rubber latexes can have a solids content from a low of about 5 wt %, about 10 wt %, or about 30 wt %, to a high of about 70 wt %, about 80 wt %, or about 95 wt %. In another example, the first, second, third, and higher iterations of styrene butadiene rubber latexes in an aqueous slurry can have a solids content greater than about 50 wt %, about 65 wt %, or about 80 wt %. In another example, the first, second, third, and higher iterations of styrene butadiene rubber latexes can have a solids content from about 5 wt % to about 95 wt %, about 20 wt % to about 70 wt %, about 40 wt % to about 60 wt %, about 45 wt % to about 55 wt %, about 47 wt % to about 54 wt %, about 30 wt % to about 54 wt %, about 33 wt % to about 48 wt %, about 51 wt % to about 54 wt %, about 55 wt % to about 65 wt %, about 50 wt % to about 60 wt %, or about 50 wt % to about 80 wt %. The weight percent of the solids content of the first, second, third, and higher iterations of styrene butadiene rubber latexes can be based on the total weight of the composition or based on the total weight of the first, second, third, and higher iterations of styrene butadiene rubber latexes, and water. The method of making the styrene butadiene rubber latexes can include iterations of the reactions until the desired solids content is achieved. For example, iterating the method steps, as needed, to form a styrene butadiene rubber latex with over 50 wt % solids content.

The first, second, third, and higher iterations of styrene butadiene rubber latexes can have a viscosity that can vary widely. For example, the first, second, third, and higher iterations of styrene butadiene rubber latexes can have a viscosity from a low of about 1 cP, about 100 cP, or about 100 cP, to a high of about 5,000 cP, to about 9,000 cP, or about 10,000 cP. In another example, the first, second, third, and higher iterations of styrene butadiene rubber latexes can have a viscosity from about 1 cP to about 10 cP, about 1 cP to about 500 cP, about 10 cP to about 50 cP, about 10 cP to about 100 cP, about 100 cP to about 500 cP, about 400 cP to about 7,000 cP, about 400 cP to about 10,000 cP, about 6,200 cP to about 8,500 cP, about 7,387 cP to about 7,500 cP, about 7,000 cP to about 8,000 cP, about 6,500 cP to about 8,550 cP, about 7,000 cP to about 8,000 cP, or about 5,000 cP to about 10,000 cP.

The method for making styrene butadiene rubber latexes can further include a method for making the one or more seeds. The method for making the one or more seeds can include, but is not limited to: mixing one or more monomers, one or more initiators, one or more chain transfer agents, one or more bases, one or more acids, one or more salts, one or more surfactants, and one or more solvents to make an initial reaction mixture; heating the initial reaction mixture to a temperature from about to about for a first reaction time of about to about to make a seed. The method for making the one or more seeds can include, but is not limited to, emulsion polymerization or solution polymerization.

The one or more monomers can include, but are not limited to: ethylene, propylene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 4-methoxy-3-methylstyrene, 4-chlorostyrene, 3,4-dimethylalphamethylstyrene, 3-bromo-4-methylalphamethylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypyropyl acrylate, dicyclopentenyl acrylate, cyclohexyl acrylate, 2-tolyloxyethyl acrylate, N,N-dimethylacrylamide, isopropyl methacrylate, ethyl acrylate, methyl alphachloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$ acrylate, tridecoxy poly(ethyleneoxy) acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethane, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinylether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl)maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N(vinyl benzyl)-pyrrolidine, N-(vinyl benzyl)piperidine, 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide and, mixtures thereof.

The one or more monomers can be included in the first reaction mixture, second reaction mixture, third reaction mixture, and higher iterations of reaction mixtures in a weight percent that varies widely. For example, the one or more monomers can be included in the first reaction mixture, second reaction mixture, third reaction mixture, and higher iterations in a weight percent from a low of about 5 wt %, about 10 wt % or about 20 wt %, to a high of about 70 wt %, about 80 wt % or about 95 wt %. In another example, the one or more monomers can be included in the first reaction mixture, second reaction mixture, third reaction mixture, and higher iterations of reaction mixtures in a weight percent from about 5 wt % to about 95 wt %, about 5 wt % to about 40 wt %, about 70 wt % to about 90 wt %, about 10 wt % to about 30 wt %, or about 40 wt % to about 70 wt %. The one or more monomers can be included in the first reaction mixture, second reaction mixture, third reaction mixture, and higher iterations of reaction mixtures in a weight percent that can be based on the total weight to the first reaction mixture, second reaction mixture, third reaction mixture, or higher iterations of reaction mixture; or based on the one or more monomers, one or more initiators, one or more chain transfer agents, one or more bases, one or more acids, one or more salts, one or more surfactants, and one or more solvents.

If two monomers are reacted together, then the two monomers can be contacted together in the initial reaction mixture in a weight percent that varies widely. For example, the first monomer can be contacted with the second monomer in the initial reaction mixture in a weight percent from a low of about 5 wt %, about 10 wt % or about 20 wt %, to a high of about 70 wt %, about 80 wt % or about 95 wt %. In another example, the first monomer can be contacted with the second monomer in the initial reaction mixture in a weight percent from about 5 wt % to about 95 wt %, about 5 wt % to about 40 wt %, about 70 wt % to about 90 wt %, about 10 wt % to about 30 wt %, or about 40 wt % to about 70 wt %. The first monomer can be contacted with the second monomer in the initial reaction mixture in a weight percent that can be based on the total weight to the initial reaction mixture; based on the total weight of the first monomer and the second monomer; based on the first monomer, second monomer, one or more initiators, one or more chain transfer agents, one or more bases, one or more acids, one or more salts, one or more surfactants, and one or more solvents.

The one or more initiators, one or more chain transfer agents, one or more bases, one or more acids, one or more salts, one or more surfactants, and one or more solvents of the method for the making the one or more seeds can all be the same as the first mixture, first reaction mixture, second mixture, second reaction mixture, third mixture, third reaction mixture, and higher iterations of mixtures and reaction mixtures of the method for making the styrene butadiene rubber latexes, as described above.

The reaction conditions for the initial reaction mixture of the method for making the one or more seeds can be the same as those for the first mixture, first reaction mixture, second mixture, second reaction mixture, third mixture, third reaction mixture, and higher iterations of mixtures and reaction mixtures of the method for making the styrene butadiene rubber latexes, as described above. For example, the initial reaction mixture can have the same ranges for the concentration of components, pH, reaction temperature, reaction time, pressure, solids content, and viscosity as the first reaction mixture.

The one or more styrene-butadiene rubber latexes can be included in one or more adhesive compositions. The adhesive compositions can include, but are not limited to: one or more styrene-butadiene rubber latexes, one or more tackifier agents, one or more additives, and water.

The concentration of the one or more styrene-butadiene rubber latexes in the adhesive compositions can vary widely. For example, the adhesive compositions can have a concentration of the one or more one or more styrene-butadiene rubber latexes from a low of about 5 wt %, about 10 wt %, or about 30 wt %, to a high of about 70 wt %, about 80 wt %, or about 95 wt %. For example, the adhesive compositions can have a concentration of the one or more styrene-butadiene rubber latexes from about 5 wt % to about 95 wt %, about 5 wt % to about 9 wt %, about 5 wt % to about 30 wt %, about 25 wt % to about 75 wt %, about 20 wt % to about 80 wt %, about 69 wt % to about 75 wt %, about 68 wt % to about 82 wt %, about 72 wt % to about 86 wt %, about 50 wt % to about 73 wt %, about 33 wt % to about 48 wt %, about 60 wt % to about 70 wt %, about 71 wt % to about 81 wt %, about 20 wt % to 30 wt %, about 50 wt % to about 60 wt %, or about 70 wt % to about 80 wt %. The weight percent of the one or more one or more styrene-butadiene rubber latexes in the adhesive compositions can be based on the total weight of the total adhesive composition; based on the total weight of the one or more styrene-butadiene rubber latexes, one or more tackifier agents, one or more additives, and water.

The one or more tackifier agents can include, but is not limited to, a rosin ester, a hydrocarbon, rosin acid, terpene, modified terpene, coumarone-indene, or a combination thereof.

The content or concentration of the one or more tackifier agents in the adhesive compositions can vary widely. For example, the adhesive compositions can have a concentration of the tackifier agents from a low of about 0 wt %, about 0.5 wt %, or about 1 wt %, to a high of about 50 wt %, about 70 wt %, or about 90 wt %. In another example, the adhesive compositions can have a concentration of the tackifier agents of less than 10 wt %, less than 5 wt %, or less than 1 wt %.

In another example, the adhesive compositions can have a concentration of the tackifier agents from about 0 wt % to about 90 wt %, 0 wt % to about 10 wt %, 0.5 wt % to about 10 wt %, about 2 wt % to about 20 wt %, about 5 wt % to about 60 wt %, about 5 wt % to about 30 wt %, about 15 wt % to about 25 wt %, about 17 wt % to about 54 wt %, about 30 wt % to about 54 wt %, about 33 wt % to about 48 wt %, about 51 wt % to about 54 wt %, or about 50 wt % to about 60 wt %. The weight percent of the one or more tackifier agents in the adhesive compositions can be based on the total weight of the total adhesive composition; based on the total weight of the one or more styrene-butadiene rubbers latexes, one or more tackifier agents, one or more additives, and water.

One or more additives can include, but are not limited to, wetting agents, surfactants, pigments, opacifying agents, anti-foam agents, water, and mixtures thereof.

The content or concentration of the one or more additives in the adhesive compositions can vary widely. For example, the adhesive compositions can have a concentration of the one or more additives from a low of about 0 wt %, about 0.5 wt %, or about 1 wt %, to a high of about 50 wt %, about 60 wt %, or about 70 wt %. In another example, the adhesive compositions can have a concentration of the one or more additives of less than 5 wt %, less than 2 wt %, or less than 1 wt %. In another example, the adhesive compositions can have a concentration of the one or more additives from about 0 wt % to about 90 wt %, about 0.1 wt % to about 10 wt %, about 0.1 wt % to about 50 wt %, 0.5 wt % to about 10 wt %, about 2 wt % to about 20 wt %, about 5 wt % to about 60 wt %, about 15 wt % to about 25 wt %, about 17 wt % to about 54 wt %, about 30 wt % to about 54 wt %, about 33 wt % to about 48 wt %, about 51 wt % to about 54 wt %, or about 50 wt % to about 60 wt %. The weight percent of the one or more additives in the adhesive compositions can be based on the total weight of the total adhesive composition; based on the total weight of the one or more styrene-butadiene rubbers latexes, one or more tackifier agents, one or more additives, and water.

The water content or concentration of water in the adhesive compositions can vary widely. For example, the adhesive compositions can have a concentration of the water from a low of about 0 wt %, about 0.5 wt %, or about 1 wt %, to a high of about 50 wt %, about 70 wt %, or about 90 wt %. In another example, the adhesive compositions can have a concentration of the water of less than 1 wt %. In another example, the adhesive compositions can have a concentration of the water from about 0 wt % to about 90 wt %, about 0.1 wt % to about 10 wt %, about 0.1 wt % to about 50 wt %, 0.5 wt % to about 10 wt %, about 2 wt % to about 20 wt %, about 5 wt % to about 60 wt %, about 15 wt % to about 25 wt %, about 17 wt % to about 54 wt %, about 30 wt % to about 54 wt %, about 33 wt % to about 48 wt %, about 51 wt % to about 54 wt %, or about 50 wt % to about 60 wt %. In another example, the adhesive compositions can be free of water. The weight percent of the water in the adhesive compositions can be based on the total weight of the total adhesive composition, or based on the total weight of the one or more styrene-butadiene rubbers latexes, one or more tackifier agents, one or more additives, and water.

The adhesive compositions can have a widely varying solids content. For example, the adhesive compositions can have a solids content from a low of about 5 wt %, about 10 wt %, or about 30 wt %, to a high of about 70 wt %, about 80 wt %, or about 95 wt %. In another example, the adhesive compositions can have a solids content greater than about 50 wt %, about 55 wt %, or about 70 wt %. In another example, the adhesive compositions can have a solids content from about 5 wt % to about 95 wt %, about 5 wt % to about 50 wt %, about 5 wt % to about 20 wt %, about 20 wt % to about 70 wt %, about 40 wt % to about 60 wt %, about 45 wt % to about 55 wt %, about 47 wt % to about 54 wt %, about 30 wt % to about 54 wt %, about 33 wt % to about 48 wt %, about 51 wt % to about 54 wt %, or about 50 wt % to about 60 wt %. The weight percent of the solids content of adhesive compositions can be based on the total weight of the adhesive composition, or based on the total weight of the one or more styrene-butadiene rubbers latexes, one or more tackifier agents, one or more additives, and water.

EXAMPLES

To provide a better understanding of the foregoing discussion, the following non-limiting examples are offered. Although the examples can be directed to specific embodiments, they are not to be viewed as limiting the invention in any specific respect.

As previously mentioned, the method making a can include the preparation of a polystyrene seed and then two or more rounds of hot emulsion reactions to generate a hot emulsion styrene butadiene rubber latex with solids content of 50% or greater. The polystyrene seed was prepared by contacting the following reagents: deionized water (1000 g), DOWFAX2A1 (15 g), sodium bicarbonate (11 g), sulfole-120 (t-dodecyl mercaptan) (0.015 g), styrene (150 g), potassium persulfate, 7 wt % in deionized water (21.7 g), sodium metabisulfite (5 g), t-butylhydroperoxide (BHP) 10 wt % in deionized water, (0.7 g), and sodium hydrogen methane sulfamic acid, 7 wt % in deionized water (10 g).

The procedure utilized a 3.5 liter continuously stirred glass reactor with an internal temperature control system. Deionized water was added to the reactor followed by purging with nitrogen to remove air. Then, the sodium bicarbonate, DOWFAX2A1, and t-dodecyl mercaptan were added, and the system was again purged with nitrogen.

The reactor temperature was set to 50° C. and then padded with 30 psig of nitrogen. Then, the agitation speed was set to 220 rpm using the stirrer. Once the reactor reached set point temperature, the styrene was dosed into the reactor in 50 mL increments at a rate of 10 mL/minute. Once styrene addition was complete, the reactor temperature was raised to 75° C. Potassium persulfate was then added as a single dose and allowed to stir for 5 minutes. Sodium metabisulfite was started at a flow rate of 0.04 mL/minute and the reactor temperature raised to 80° C. After addition of sodium metabisulfite the reactor temperature was increased to 85° C. The reaction was allowed to proceed for 45 minutes, after which the reactor temperature was reduced to 54° C. followed by injection of t-butylhydroperoxide (BHP) (single portion) and addition of sodium hydrogen methane sulfamic acid solution at 0.3 mL/minute. The reactor temperature was reduced to 30° C. and the product removed from the reactor. A polystyrene latex having 14.4 weight percent solids with particle size of 45.95 nm was obtained, which acts as the polystyrene seed for the second segment of the reaction.

Next, the polystyrene seed is polymerized in a pressure reactor one or more times to generate a hot emulsion styrene butadiene rubber latex of desired solids content. The first styrene butadiene rubber latex was prepared by contacting the following reagents: polystyrene (12.17 g), DOWFAX2A1 (0.13 g), sodium bicarbonate (0.11 g), sulfole-120 (t-dodecyl mercaptan) (0.011 g), styrene (2.92 g), potassium persulfate, 7 wt % in deionized water (0.71 g), sodium metabisulfite (0.594 g), t-butylhydroperoxide, 10 wt % in deionized water, (0.26 g), sodium hydrogen methane sulfamic acid, 7 wt % in deionized water, (0.26 g), SB-61 (0.61 g), and 1,3-butadiene (11 g).

In the first reaction, a 60 mL pressure reactor containing a magnetic stirrer, temperature probe and pressure monitor was set up in a temperature-controlled bath. All the reagents except the 1,3-butadiene were charged into the reactor at 25° C., which was then nitrogen purged to remove air. The pH was checked to determine the alkalinity of the mixture. The agitation for the reactor was set to over 1,000 rpm employing the magnetic stirrer. The specified quantity of 1,3-butadiene was charged into the reactor, the reactor temperature set to 50° C., and the reactor was padded with 80 psig nitrogen to minimize butadiene reflux. The reaction proceeded for 23 hours until polymerization was stopped, and the product was removed and analyzed. The resulting product was a styrene butadiene rubber latex having 46 weight percent solids, pH=9.0, and particle size of 141 nm. This styrene butadiene rubber latex acts as a seed for further polymerization.

TABLE 1

Results of single stage reaction at low pH

| Run | Stage | pH | Run Time, h | Particle size, nm | % Solids | % Styrene (Bound) | % Styrene (residual) |
|---|---|---|---|---|---|---|---|
| I | 1 | <4.0 | 20 | 121 | 40 | N/A | N/A |

The second reaction runs similarly to the first reaction, except the styrene butadiene rubber latex generated from stage one acts as the seed. 11.99 g of the styrene butadiene rubber latex generated from stage one was charged into the reactor. The same polymerization steps from the first reaction were applied to the seed, and the reaction was allowed to proceed for another 23 hours after the 1,3-butadiene was charged into the reactor. After 23 hours the product was removed from the reactor and analyzed. The product was determined to be styrene butadiene rubber latex having 53 weight percent solids, pH=9.0, and particle size of 356 nm. The styrene butadiene rubber latex had bound styrene of 32 wt % and residual styrene of 1.5 wt %.

TABLE 2

Two-Stage High pH

| Run T | Stage | pH | Run Time, hrs. | Particle size, nm | % Solids | % Styrene (Bound) | % Styrene (residual) |
|---|---|---|---|---|---|---|---|
| I | 1 | 9.0 | 23 | 141 | 46.40 | 32 | N/A |
| I | 2 | 9.0 | 23 | 356 | 53.14 | 32 | 1.5 |
| II | 1 | 9.0 | 23 | 210 | 46.34 | 25 | 1.22 |
| II | 2 | 9.0 | 23 | 425 | 52.20 | 31 | 1.6 |

In the examples, the first reaction yielded a lower solids content styrene butadiene rubber latex, than the second reaction, where the latex is further polymerized to create a styrene butadiene rubber latex with a higher solids content (over 50 wt %).

One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits can be the values from the examples. Certain lower limits, upper limits and ranges appear in at least one claims below.

Unless otherwise indicated, all numbers expressing feature sizes, amounts, and physical properties used in the specification and claims are to be understood as being modified in all instances by the term "about." The term "about" is defined to be ±2% of the modified value.

Although the invention has been described with reference to the above examples, it will be understood that modifications and variations are encompassed within the spirit and scope of the invention. Accordingly, the invention is limited only by the following claims.

What is claimed is:

1. A method for making styrene butadiene rubber latex comprising:
   mixing a seed, a styrene, an initiator, a base, a surfactant, and a solvent to make a first mixture, wherein the first mixture has pH from about 4.0 to about 12.0;
   adding a first portion of 1,3-butadiene to the first mixture to make a first reaction mixture;
   heating the first reaction mixture to a temperature above 40° C. for a first reaction time from about 10 hours to about 24 hours to make a first styrene butadiene rubber latex, wherein the first styrene butadiene rubber latex has a viscosity from about 1 cP to about 500 cP;
   mixing the first styrene butadiene rubber latex, a styrene, a base, an initiator, a surfactant, and a solvent to make a second mixture, wherein the second emulsion has a pH from about 4.0 to about 12.0;
   adding a second portion of 1,3-butadiene to the second mixture to make a second reaction mixture; and
   heating the second reaction mixture to a temperature above 40° C. for a second reaction time of from about 10 to about 24 hours to make a second styrene butadiene rubber latex, wherein the solids concentration is higher than that of the first solids concentration, wherein the second styrene butadiene rubber latex has a solids content greater than 50 wt %.

2. The method of claim 1, wherein the seed is selected from group comprising: polystyrene, natural rubber, styrene-butadiene, nitrile rubber, and polybutadiene.

3. The method of claim 1, wherein the seed is made by a method comprising:
   mixing a monomer, an initiator, a base, a surfactant, and a solvent to make an initial reaction mixture, wherein the initial reaction mixture has pH from about 4.0 to about 12.0;
   heating the initial reaction mixture to a temperature above 40° C. for an initial reaction time from about 10 hours to about 24 hours to make the seeds, wherein the seed has a solids content of greater than 15 wt %.

4. The method of claim 1, wherein the seed has an average particle size from about 20 nm to about 40 nm.

5. The method of claim 1, wherein the surfactant is selected from a list comprising: alkyldiphenyloxide disulfonate; benzene, 1,1'-oxybis-, tetrapropylene sulfonate; sodium 4-(4-dodecoxysulfonylphenoxy)benzenesulfonate; alkyl mercaptan; ethoxylated amines; ethoxylated long-chain alcohols; polyglucosides; alkyl ammonium bromides; alkyl sulfonates; alkoxylated sulfates; alkyl ether sulfates; alkyl ester sulfonates; alpha olefin sulfonates; linear alkyl benzene sulfonates; branched alkyl benzene sulfonates; linear dodecylbenzene sulfonates; branched dodecylbenzene sulfonates; alkyl benzene sulfonic acids; dodecylbenzene sulfonic acid; sulfosuccinates; ethoxylated sulfated alcohols; alcohol sulfonates; ethoxylated alcohol sulfonates; propoxylated alcohol sulfonates; alcohol ether sulfates; ethoxylated alcohol ether sulfates; propoxylated alcohol sulfonates; sodium xylene sulfonate; sodium dodecyl diphenyl ether disulfonate; sulfated nonyl phenols; ethoxylated sulfated nonyl phenols; propoxylated sulfated nonyl phenols; sulfated octyl phenols; ethoxylated sulfated octyl phenols; propoxylated sulfated octyl phenols; sulfated dodecyl phenols; ethoxylated sulfated dodecyl phenols hydroxysultaines; propoxylated sulfated dodecyl phenols hydroxysultaines; ethoxylated dodecanol; alkyl ammonium bromides; cetyl trimethyl ammonium bromide; methyl sulfonate; heptyl sulfonate; decylbenzene sulfonate; dodecylbenzene sulfonate; cocoamidopropyl hydroxysultaine; lauramidopropyl hydroxysultaine; lauryl hydroxysultaine.

6. The method of claim 1, wherein the initiator is selected from a list comprising: potassium persulfate, cumene hydroperoxide, 2,2'-azobis[2-(2-imidazolin-2-yl)propane] dihydrochloride, tert-butyl hydroperoxide, di-tert-butyl peroxide, dicumyl peroxide, benzoyl peroxide, ammonium peroxodisulfate, dicyandiamide, cyclohexyl p-toluenesulfonate, (4-hydroxyphenyl)dimethylsulfonium hexafluorophosphate, diphenyl(methyl)sulfonium tetrafluoroborate, benzyl(4-hydroxyphenyl)methyl sulfonium hexafluoroantimonate, (4-hydroxyphenyl)methyl(2-methylbenzyl)sulfonium hexafluoroantimonate, and triphenylsulfonium nonafluoro-1-butanesulfonate.

7. The method of claim 1, wherein the first styrene butadiene rubber latex has a styrene butadiene rubber with an average particle size from about 50 nm to about 100 nm.

8. The method of claim 1, wherein the second styrene butadiene rubber latex has a styrene butadiene rubber with an average particle size from about 100 nm to about 250 nm.

9. The method of claim 1, wherein the second styrene butadiene rubber latex has a viscosity from about 400 cP to 10,000 cP.

10. The method of claim 1, wherein the second styrene butadiene rubber latex has a solids content from about 55 wt % to about 65 wt %.

11. The method of claim 1, wherein the second styrene butadiene rubber latex about 1 cP to about 500 cP.

12. The method of claim 1, wherein the first reaction further comprising a chain transfer agent, wherein the chain transfer agent is selected from a list comprising: alkyl mercaptan, tert-dodecyl mercaptan, carbon tetrachloride, carbon tetrabromide, bromotrichloromethane, 4-methylbenzenethiol, isooctyl 3-mercaptopropionate, pentaphenylethane, and tert-nonyl mercaptan, 4,4'-thiobisbenzenethiol.

13. A styrene butadiene rubber latex composition made by a process comprising:
   mixing a seed, a styrene, an initiator, a base, a surfactant, and a solvent to make a first mixture, wherein the first mixture has pH from about 4.0 to about 12.0;
   adding a first portion of 1,3-butadiene to the first mixture to make a first reaction mixture;
   heating the first reaction mixture to a temperature above 40° C. for a first reaction time from about 10 to about 24 hours to make a first styrene butadiene rubber latex, wherein the first styrene butadiene rubber latex has a viscosity from about 1 cP to about 500 cP;
   mixing the first styrene butadiene rubber latex, a styrene, a base, an initiator, a surfactant, and a solvent to make a second mixture, wherein the second emulsion has a pH from about 4.0 to about 12.0;
   adding a second portion of 1,3-butadiene to the second mixture to make a second reaction mixture; and
   heating the second reaction mixture to a temperature above 40° C. for a second reaction time of from about 10 hours to about 24 hours to make a second styrene butadiene rubber latex, wherein the solids concentration is higher than that of the first solids concentration, wherein the second styrene butadiene rubber latex has a solids content greater than 50 wt %.

14. The styrene butadiene rubber latex composition of claim 13, wherein the first styrene butadiene rubber latex has a styrene butadiene rubber with an average particle size from about 50 nm to about 100 nm.

15. The styrene butadiene rubber latex composition of claim 13, wherein the second styrene butadiene rubber latex has a styrene butadiene rubber with an average particle size from about 15 nm to about 500 nm.

16. The styrene butadiene rubber latex composition of claim 13, wherein the second styrene butadiene rubber latex has a solids content from about 50 wt % to about 60 wt %.

17. The styrene butadiene rubber latex composition of claim 13, wherein the second styrene butadiene rubber latex has a viscosity from about 1 cP to about 500 cP.

* * * * *